May 24, 1966     H. R. MALMGREN     3,252,558
BALE DIVERTER FOR MOW CONVEYORS
Filed Aug. 17, 1964
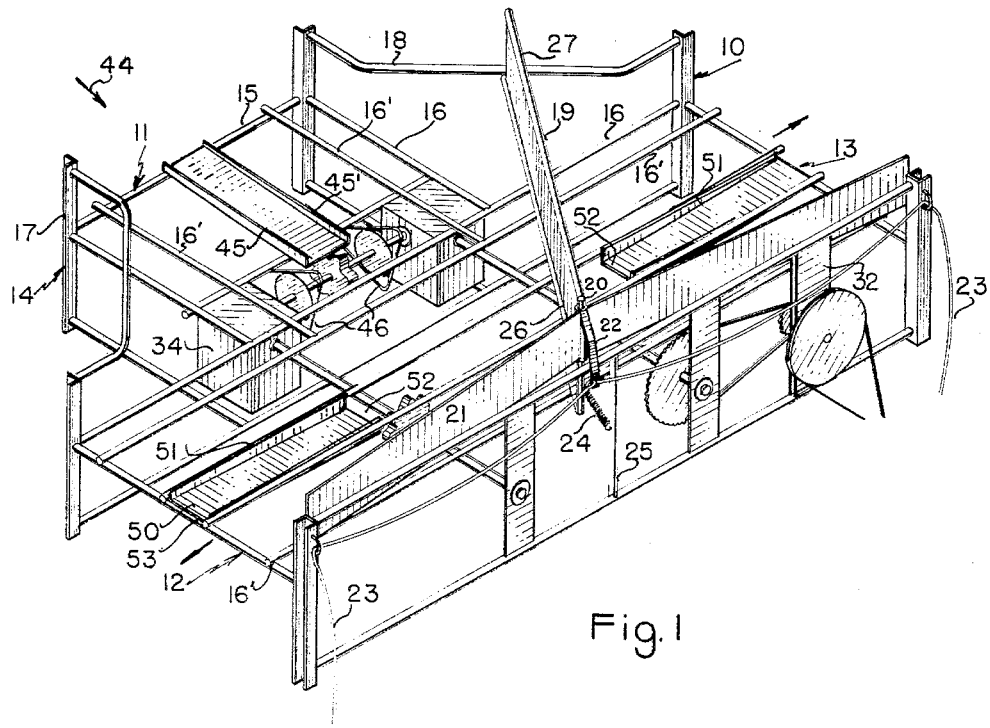
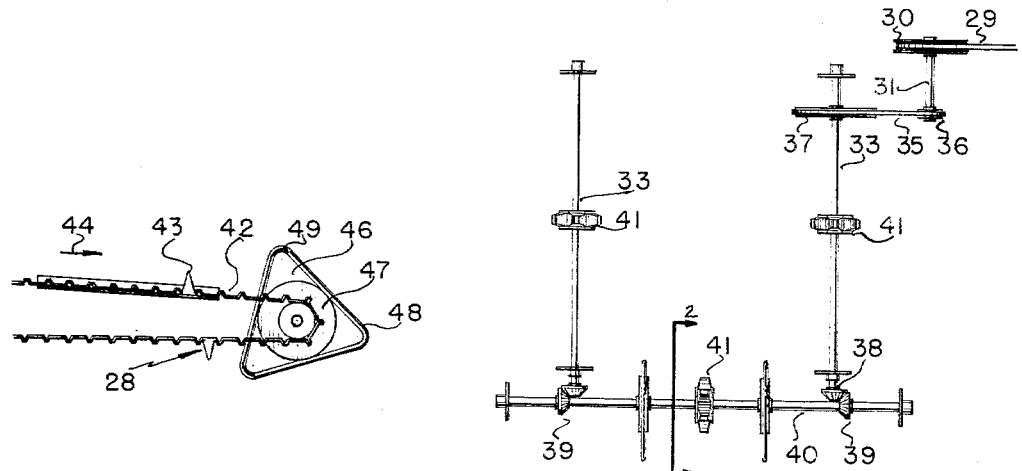
INVENTOR:
HARVEY R. MALMGREN
HIS ATTYS

United States Patent Office 3,252,558
Patented May 24, 1966

3,252,558
BALE DIVERTER FOR MOW CONVEYORS
Harvey R. Malmgren, Winnipeg, Manitoba, Canada, assignor, by mesne assignments, to Alco Equipment Ltd., Winnipeg, Manitoba, Canada
Filed Aug. 17, 1964, Ser. No. 390,038
4 Claims. (Cl. 198—1)

My invention relates to new and useful improvements in bale diverters for mow conveyors.

The principal objection to current bale diverters is the fact that it is difficult to disengage the bale from the entry portion thereof, urge it forwardly while it turns the corner, and then re-engage the bale with the exit chute conveyor chain.

The normal diverter includes conveyor chains having upwardly extending prongs which engage the underside of bales being carried thereby. If means are not provided to disengage the bale from the hook, then tearing occurs as the bale is being turned through 90°. On the other hand if means are provided to disengage the hooks from the bale, the usual method of forcing the bale around the corner is to utilize the bales travelling behind, to push the bale around the corner so that it is engageable by the exit conveyor chain.

Either method of course suffers from considerable disadvantages inasmuch as jamming often occurs and damaged bales result.

I have overcome these disadvantages by providing a bale diverter which includes an entry chute and a pair of exit chutes, said entry chute including means to disengage the bale from the chain and at the same time urge the bale forwardly and around the corner so that it can be picked up by the exit conveyor chain assembly.

The principal object and essence of my invention is therefore to provide a device of the character herewithin described which enables bales to be disengaged from the entry conveyor chain and at the same time urges them forwardly and around the corner until they can be picked up by the exit conveyor chain assembly.

Another object of the invention is to provide a device of the character herewithin described which includes ramps on the exit conveyor portions of my diverter which controls the depth of penetration of the hooks of the conveyor chain with the underside of the bale until the bale is completely around the corner and lined up with the exit conveyor chain thus preventing the edge of the bale from jamming against the extending hooks of the conveyor chain.

Another object of the invention is to provide a device of the character herewithin described in which a common source of power drives both the entry conveyor chain and the two exit conveyor chain assemblies.

A yet further object of the invention is to provide a device of the character herewithin described which permits the bale diverter to be situated in any conventional mow conveyor.

A still further object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of my bale diverter per se.

FIGURE 2 is an enlarged fragmentary sectional view along the line 2—2 of FIGURE 3.

FIGURE 3 is a top plan view of the drive assembly per se.

In the drawings like characters of reference indicate corresponding parts in the different figures.

Proceeding therefore to describe my invention in detail, reference should be made to the accompanying drawings in which the bale diverter collectively designated 10 includes an entry chute collectively designated 11 and a pair of exit chutes collectively designated 12 and 13, it being noted that the exit chutes 12 and 13 are in alignment one with the other and are situated at right angles to the entry chute 11.

The conveyor comprises supporting framework collectively designated 14 including transverse rails 15 and longitudinally extending rails 16 all of which are connected to various corner support posts 17 as clearly illustrated.

Upper rails 18 extend between the corner posts of the entry chute 11 and the corner posts of the exit chutes 12 and 13 form part of the guiding members to guide bales from the entry chute 11 to either of the exit chutes 12 and 13. The exit chute into which the bale is guided, is determined by the bale deflection panel 19 which is substantially rectangular when viewed in side elevation and is pivotally secured by means of pin 20, to the rear wall 21 of the diverter. An off-standing bracket 22 is secured to the deflection 19 beyond the pivot point 20 and control ropes 23 extend from this member 22 downwardly to a convenient location for operating. An over center spring device 24 extends between a vertical member 25 and the lower edge 26 of the deflection 19 thus maintaining the deflection in one or other of the positions with the outboard end 27 engaging the rail 18 as clearly shown.

A chain conveyor sprocket assembly collectively designated 28 is provided for the entry chute assembly and also for each of the exit chute assemblies. However, it should be noted that the conveyor chain portion of the exit chute assemblies is not illustrated in the accompanying drawings as the details thereof are well known.

Reference to FIGURE 3 shows the drive mechanism for the chain conveyor assemblies, said device being driven by a source of power (not illustrated) via belt 29 which extends around pulley 30 mounted upon stub shaft 31 journalled for rotation within a vertical member 32 upon the framework.

A pair of spaced and parallel shafts 33 are journalled for rotation within the framework 14, said shafts extending transversely across the exit chutes 12 and 13 and being journalled, by one end thereof, within gear boxes 34 situated within the framework upon either side of the entry chute assembly 11.

Chain 35 extends around sprockets 36 and 37 and conveys the drive from shaft 31 to one of the shafts 33.

Bevel gear assemblies 38 upon the ends of shafts 33 engage corresponding bevel gears 39, upon a cross shaft 40, said bevel gears 39 being situated within gear boxes 34.

Cross shaft 40 extends across the inner end of the entry chute 11 as clearly illustrated in FIGS. 1 and 3.

Both of the shafts 33 and the shaft 40 include a chain sprocket 41 centrally located around which the aforementioned conveyor chains extend, reference character 42 showing the conveyor chain extending around the sprocket 41 forming part of the entry chute assembly 11.

The conveyor chains are provided with bale engaging hooks 43 extending upwardly therefrom in the conventional manner.

The conveyor chain 42 of the entry chute 11 travels in the direction of arrow 44 bringing the bales towards the diverter due to the engagement of the hooks 43 with the underside of said bales. The bales travel on longitudinal bale engaging members 16' situated in spaced and parallel relationship with the member 16.

As the bale approaches the entry chute, the upper run of the conveyor chain passes over a supporting ramp 45 which terminates just prior to the relevant chain sprocket 41. The sides 45' of this chute increase in height as they approach the sprocket 41 thus elevating the bale and gradually disengaging the hooks 43 from the bale. At the same time the bale engaging members 16' are elevated slightly (not illustrated) to support the bale in this general area.

Mounted upon the shaft 40 and upon each side of the sprocket 41 is a bale jogging element 46. Said bale jogging element comprises a disc 47 secured to the shaft 40 together with a rod 48 formed into a triangle when viewed in side elevation and secured to the periphery of the disc 47 as by welding, it being understood that these triangular joggers rotate with the shaft 40. As the bale reaches these joggers, the apices 49 thereof hit the underside of the bale and move it upwardly thus fully disengaging the bale from the hooks 43 within this area. The apices 49 hitting the underside of the bale also jog the bale forwardly towards the deflector 19 until the bale hits the deflector at which time it is pushed around the corner depending upon the position of the deflector, into a position to be picked up by the exit chute conveyor assembly.

As the bale is jogged around the corner, it is necessary to prevent the lower edge of the bale from striking the prongs 43 of the exit chute conveyor until the bale is fully in alignment with this conveyor.

In this connection, I have provided sloping ramps 50 adjacent each of the sprockets 41 of the exit conveyors, the sides 51 of these ramps being higher as the inner ends 52 thereof so that only the tips of the prongs 43 engage the underside of the bale as it is jogged around the corner until the bale is fully in alignment with the exit chute and is commencing to move therealong. As the bale clears the outer ends 53 of these ramps, the full engagement of the prongs is permitted with the underside of the bale.

It will therefore be seen that the bales approaching the entry chute are disengaged from the prongs 43 and at the same time are urged or jogged forwardly by the rotation of the triangular joggers 46 around the corner and into the relevant exit chute depending upon the position of the deflector 19. This diverting of the bales is carried out without any tearing of the underside of the bales or without any strain occurring upon the structure and without the possibility of bales piling up at the diverter section.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A bale diverter for mow conveyors which include conveyor chains having bale engaging prongs secured thereto, comprising in combination an entry chute and a pair of exit chutes each situated at right angles to said entry chutes and at 180° to one another, a selectively positionable bale deflector extending into said entry chute to divert bales entering said entry chute, into one or other of said exit chutes, said entry chute and said exit chutes including chain conveyor sprocket assemblies, a source of power for said sprocket assemblies, means on said entry chute sprocket assembly to disengage said bale from the conveyor chain passing over said entry chute sprocket assembly and to urge said bale towards one or other of said exit chutes, and a sloping ramp in each of said exit chutes controlling the degree of engagement of said bale engaging prongs with said bale as said bale is being diverted from said entry chute to one or the other of said exit chutes.

2. The device according to claim 1 in which said means includes at least one bale jogging element secured to and rotating with said sprocket assembly.

3. The device according to claim 2 in which said bale jogging element comprises a triangular element secured to the shaft of said sprocket assembly, the apices of said element engaging the underside of said bale as said element rotates.

4. In a bale diverter which includes an entry chute, a pair of in line exit chutes at right angles to said entry chute, a bale deflector associated with said exit chute, conveyor chains for said chutes and a chain conveyor sprocket assembly for disengaging said bale from said conveyor chain and for urging said bale towards one or the other of said exit chutes, said means comprising at least one jogger element rotatable with said sprocket assembly, said bale jogging element comprising a triangular element secured to the shaft of said sprocket assembly, the apices of said element engaging the underside of said bale as said element rotates.

References Cited by the Examiner

UNITED STATES PATENTS

Re. 15,626    6/1923    Plonka _____ 198—78
2,586,324    2/1952    Graves.

FOREIGN PATENTS 700,321    12/1964    Canada.
517,237    12/1920    France.

EVON C. BLUNK, *Primary Examiner.*

RICHARD E. AEGERTER, *Examiner.*